Figure 1:
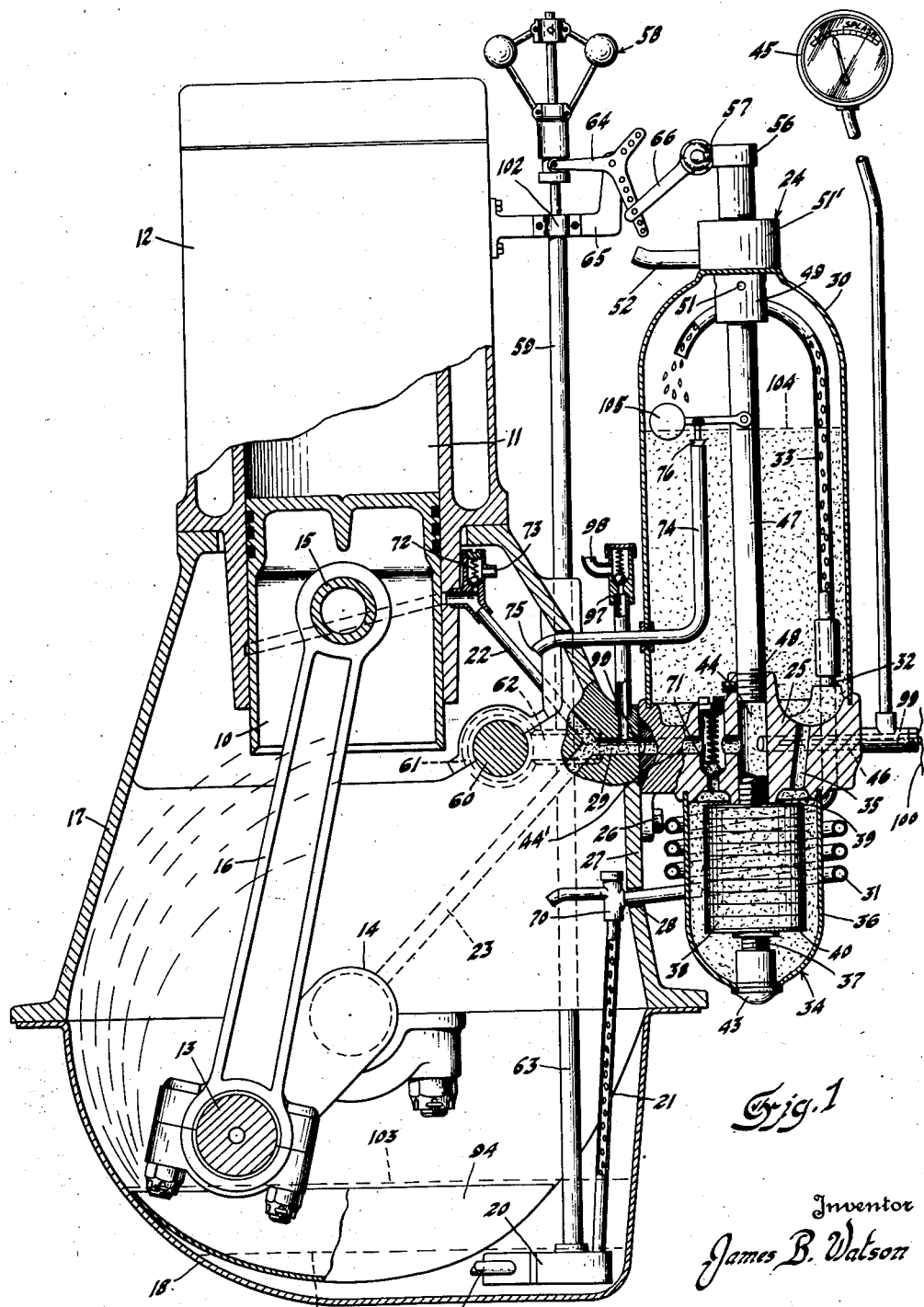

May 21, 1935.  J. B. WATSON  2,001,858
LUBRICATING SYSTEM WITH INITIAL SPLASH
Filed May 20, 1929   2 Sheets-Sheet 1

Inventor
James B. Watson
By
Blackmore, Spencer & Hiah
Attorneys

May 21, 1935.   J. B. WATSON   2,001,858
LUBRICATING SYSTEM WITH INITIAL SPLASH
Filed May 20, 1929   2 Sheets-Sheet 2
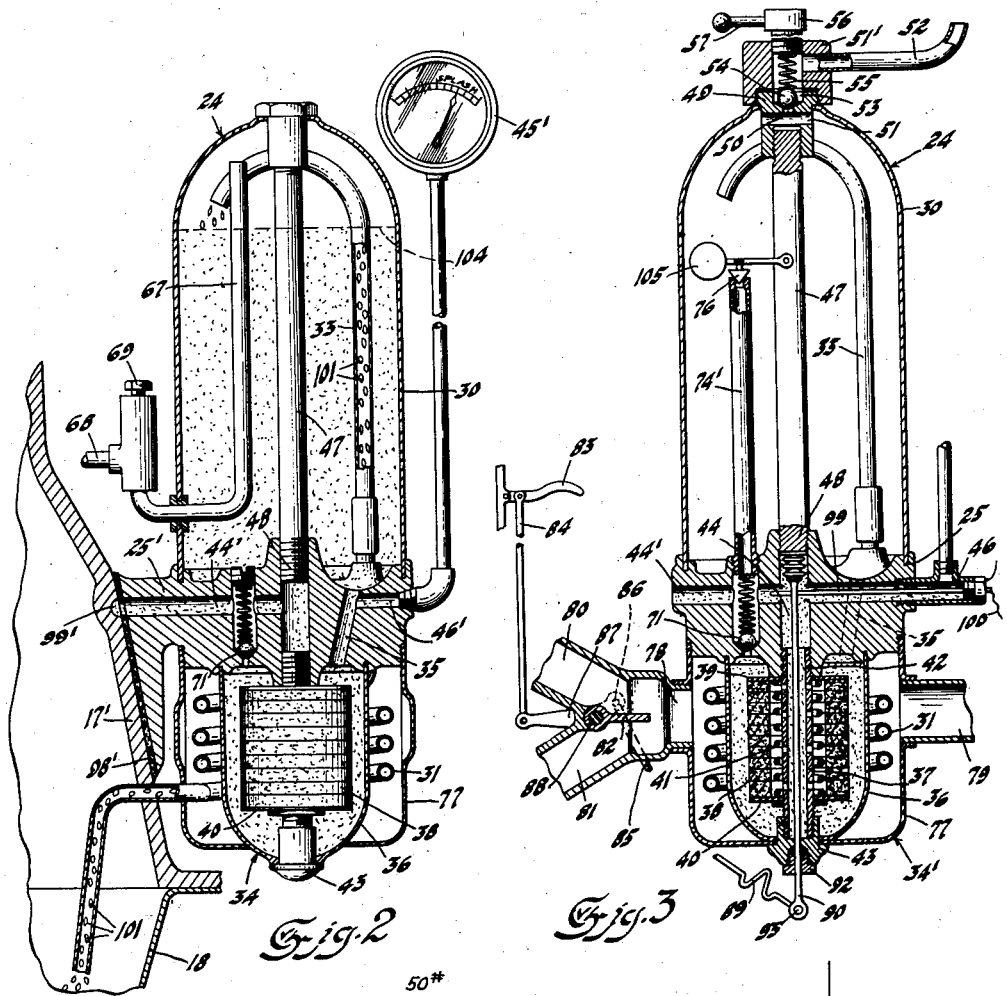

Patented May 21, 1935

2,001,858

UNITED STATES PATENT OFFICE 2,001,858

LUBRICATING SYSTEM WITH INITIAL SPLASH

James B. Watson, Detroit, Mich., assignor, by mesne assignments, to General Motors Corporation, Detroit, Mich., a corporation of Delaware Application May 20, 1929, Serial No. 364,471

14 Claims. (Cl. 184—6)

This invention relates to engine lubrication; and particularly to the lubrication of an engine by means and methods which, in view of the wear of parts and the waste of oil involved in the use of usual systems, provide for copious "splash" during starting or warming-up periods, and also for automatically terminating these periods in favor of pressure lubrication whenever a quantity of lubricating oil, which may have been initially retained in a sump or oil pan or in separate troughs within an oil pan, becomes sufficiently fluent for satisfactory circulation through a pressure system; and advantageous embodiments of this invention may include, in addition to a pump or pumps adapted to draw oil and/or mixtures of air and oil from the mentioned pan, and in addition to pressure conduits adapted to deliver the pumped oil to various bearings disposed for a return drainage into said pan or into the mentioned troughs therein, a novel pressure-determining unit or a complete oil-normalizing assembly, and/or control means, as hereinafter described.

Damaging effects due to delayed lubrication or to contamination or to dilution of oil by fuel or water are well known; but removal of the diluents has been found to render increasingly difficult an adequate circulation of oil at low temperatures,—the use of devices for the removal of fuel by distillation, when unsupported by good distributing methods and additional features such as are herein described, being sometimes found actually to shorten engine life by an increase in the duration of dry-running periods; and it is an object of the present invention, preferably including a novel normalizing assembly of the general character described herein, to minimize or obviate such dry-running periods,—at the same time facilitating start, obviating wear and conserving oil.

It is an object of this invention to provide an engine, whose crank case may remain interiorly under a substantially atmospheric or subatmospheric pressure, with lubricating methods and means whereby a starting period of splash lubrication, effective promptly to lubricate pistons as well as shafts and rod bearings and to give to the lubricating oil a desired fluidity by the combined effects of agitation and heat exchange, is followed by a normal-running period of practically constant or predetermined pressure lubrication during which a mixture of oil and hydrocarbon vapors, products of combustion and/or air (hereinafter referred to as aeriform bodies) is so advanced and used as to create and to maintain, within advantageous limits, a predetermined optimum range of pressure or pressures in conduits leading to bearings or the like; and the pressure or pressures so built up may be effective, upon the stopping of the engine, gradually to return through various bearings a quantity of oil suitable to a temporary renewal of splash lubrication whenever the engine is again started.

In the practice of this invention, a suitable engine crank case may be provided with lateral or other openings adapted to serve as or to receive conduits communicating with the mentioned normalizing assembly or with any desired units appropriate thereto; and it is a further object of this invention (ordinarily avoiding oil temperatures above standard practice or oil pressures above the usual range, and preferably utilizing a suction withdrawal of undesired aeriformed bodies in the form of bubbles entrained in oil) to provide a normalizing assembly which is suitable for lateral or other application to a crank case, or the like,—said assembly preferably comprising, in addition to a separatory and pressure-determining receptacular unit, a thermal control unit and/or a filtering or other composition-control unit, or a combination of such units assuring a reconditioning of oil and its delivery at a desired temperature and pressure; and preferred embodiments of this invention, permitting escape of aeriform bodies subsequently to a utilization thereof in promoting a heat exchange and in predetermining a delivery pressure, may comprise a cast or other partition member provided with a plurality of passages and serving to support one or two or more of the mentioned units from a crank case. The composition-control unit may include any standard filter, or the like, supported in a dependent position which is favorable to the incidental removal of water and/or other sludge from the bubble-free oil; and this filter or its equivalent is optionally surrounded by or otherwise associated with a thermal-equilibrium coil immersed in air or in another cooling or heating fluid,—said coil being elongated favorably to a utilization of the mentioned bubbles, advancing therethrough with the pumped oil, in accelerating heat exchange between said fluid and said oil, to obtain a desired viscosity favorable to maximum lubricating effect and to a uniform delivery by uniform pressure.

The invention aims to provide means whereby oil may be promptly warmed to a temperature favorable to its circulation and to a maximum lubricating effect, said oil being afterwards so cooled, in case engine operation tends unduly to elevate the temperature thereof, as to obviate loss of lubricating efficiency,—a desired heat balance as well as a desired pressure balance being automatically maintained during normal running condition and the composition of the lubricating oil being optionally restored by means referred to.

Other objects of this invention, optionally including a provision of valved passages permitting a short-circuit return of oil in case of obstruction within the mentioned normalizing assembly or any of its parts and/or a provision of thermostatic means and/or overflow means and/or means for maintaining different pressures within respective parts or branches of the lubricating system, and/or a provision of means rendering some or all of said pressures responsive to variation in throttle position or to speed of operation and/or means assuring continued or restored splash lubrication in case of delayed or defective operation of a mentioned unit or means, may be best appreciated from the following descriptions of illustrative embodiments thereof taken in connection with the appended claims and the accompanying drawings.

Figure 1 is a general view, partly in elevation and partly in vertical section,—parts being conventionally shown and other parts broken away or omitted. An initial period of splash lubrication is assumed, in this figure, to be drawing to a close in favor of lubrication from an elevated separatory pressure reservoir.

Figure 2 is a view comparable with a portion of Figure 1, but showing alternative features and assuming a level in the separatory pressure reservoir to have been raised appropriately to normal-running conditions,—oil without vapors having been pumped thereto, and excess vapors, as now continuously pumped, being permitted to escape, by means slightly different from those suggested in Figure 3, from a reservoir from which no overflow is shown.

Fig. 3 is a detail view corresponding to a portion of Figure 1, but taken on a larger scale and showing additional and optional features of thermal control,—the oil levels indicated in this view being appropriate to those periods of rest wherein the bulk of the lubricating oil is assumed to have been gradually forced from the pressure reservoir back into an oil pan or into troughs therein, to assure splash lubrication upon restarting.

Fig. 4 is a diagram comparing the action of the lubricating system herein described with that of a currently conventional force feed system.

Referring to the general relationships of parts shown in Figure 1, a piston 10, movable within a cylinder 11 in an engine block 12, is shown as connected with a crank 13 of a shaft 14 by means of a pin 15 and a rod 16, these known parts being movable in a usual manner within a crank case 17 and an oil pan 18,—the latter being preferably rather shallow and/or provided with troughs appropriate to initial splash lubrication.

Within the pan 18, a suction pipe 19 connected with a pump 20 is shown as comprised in an oil circulating system including a pipe or conduit 21 for the advance of oil toward pressure conduits 22, 23, or the like, leading to bearings such as those by which the rod 16 is connected to the pin 15 and the crank 13; and a normalizing assembly 24, within the scope of the present invention, is shown as laterally supported from the crank case 17 and in communication with the mentioned conduits. The normalizing assembly 24 may include, in addition to a cast or other supporting and partitioning element 25 (which may be secured, as by means of bolts or screws 26, to a vertical or other surface 27 provided with suitable apertures 28 and 29 for the mentioned conduits) a separatory pressure chamber or receptacle 30 comprised in a pressure-control unit with the interior of which the conduit 21 is directly or indirectly connected. Incidentally to provide a thermal control unit, and in order normally to deliver a mixture of oil with air and vapors at a high level favorable to separation within the receptacle 30, serving as a pressure reservoir, the conduit 21 is shown as continuous with a coil 31, adapted to be exposed to a thermal fluid; and said coil is shown as communicating, by a passage 32, with an upwardly extending but downwardly terminating fountain conduit 33, adapted to effect a spray delivery into receptacle 30,—such delivery being favorable to a sufficient separation of vapors entrained with air in the pumped oil mixture, even though the temperature be lower and/or the pressure be higher in said receptacle than in the crank case.

Any desired proportion of the air or other aeriform bodies which may be delivered into the receptacle 30 during and after an initial period of splash lubrication may be utilized in producing a pressure delivery of the lubricating oil directly into the conduits 22, 23 or the like, or through a suitable filter or other composition-control unit,—such as a so-called "filtrator" 34 of the general character best shown in Figure 3.

This unit may receive oil through a passage or passages 35 in the partitioning and supporting element 25 or its equivalent; and it may ordinarily comprise, in addition to a round or other container 36 and a laterally apertured central tubular element 37, an interposed body or structure of filtering material 38,—this being shown as including annuli and plates 39 and 40, between which spacing means such as a spring 41 may be disposed. The tubular element 37 is shown as threaded at its inner end 42 into the casting 25 and as outwardly provided with a nut 43 for the retention of the container 36. Water and/or other sludge may be permitted to accumulate for considerable periods at the bottom of the container 36; and the filtered oil may be delivered from the tubular element 37 through a passage 44, 44', communicating with pressure conduits 22, 23, or the like.

A pressure gauge or gauges 45 or 45' may be connected with any of the mentioned passages, as by means of a lateral passage or passages 46, 46', communicating with passage 44, or passage 32; and any suitable means may be employed to maintain a desired pressure range and/or a desired level within the metallic or other separatory reservoir 30. For example, a bolt or rod 47 being shown as threaded at 48 into the casting 25, a special nut 49, at the upper end thereof, may be adapted not only to retain the pressure receptacle 30 but to carry a valve organization controlling the exit of air, etc. therefrom. The nut 49 is shown in Figure 3 as provided with a longitudinal passage 50 with which lateral openings 51 interiorly communicate; and said nut is shown as surmounted by a chambered element 51', carrying an outlet conduit 52 and having a valved inlet opening 53,—the latter communicating with the passage 50. Valve 54 in opening 53 is shown as normally seated under pressure of a spring 55; and the action of this spring may be subject to remote control by means such as a threaded or other cam element 56, manipulable by an arm 57, but maintaining pressure below the limit of pump 20.

In Figure 1, the arm 57 is diagrammatically shown as subject to automatic adjustment in response to variations in the speed of a governor 58. This governor, or its equivalent, may be driven through a shaft 59 from any suitably rotated parts such as a cam shaft 60 and gears 61 and 62 (diagrammatically shown as serving also to rotate a shaft 63 by which the pump or pumps 20 may be driven); and a lever 64, carried by a bracket 65 and operated by the governor 58, is shown as connected with arm 57 by means of an intermediate link or rod 66; but the diagrammatic character of this representation will be immediately appreciated. A simpler construction, employing a down pipe 67 in communication with an outlet 68, the latter being subject to manual or other control through an adjustable valve 69, is suggested in Figure 2.

In order to obviate risk of dry bearings and/or harm to parts of a normalizing assembly of the general character referred to, adjustable relief valves may be provided at any desired points,—as, at 70 (for immediate return of oil in case of obstruction or undue resistance within coil 31 or its equivalent), at 71 (to permit deliveries into the passage 44 and thereby into the conduits 22, 23, or the like, in case of obstruction within the filtering unit 34 or its equivalent) and/or at 72,—an outlet 73 from the latter being adapted to permit a return of oil, not required by the respective bearings, in case too much oil be provided or in case the pump or pumps 20 become, under specific conditions of operation, so efficient as to fill the separatory receptacle 30, or its equivalent, above a desired level. To obviate all risk of delivery of a "solid" stream of oil through the outlet 52 or the outlet 68, intended for the exit of excess air, vapors and the like, means such as an overflow pipe 74, shown in Figure 1 as delivering at 75 into the crank case, or an overflow pipe 74', shown in Figure 3 as delivering into the pressure passage 44', may be employed in conjunction with a float controlled valve 76 of any preferred type; and, as further suggested in Fig. 3, any desired additional means may be provided, preferably in connection with the coil 31 or its equivalent, to control the temperature of the oil normally advancing from said coil and/or through the filter unit 34, or 34' or its equivalent.

In Figure 3, a thermal control unit comprising coil 31 is shown as including also a jacket element 77. This may, when employed and if desired, be provided with a threaded or other connection to the casting 25 and/or engaged by the mentioned nut 43; and it is shown as provided with an inlet opening 78 and with an outlet 79 through which hot or cold air or water or other thermal fluid may be so advanced as to keep the temperature of said coil and/or said filter within a predetermined range. For example, the inlet 78 may communicate with a cold-fluid passage 80 and with a hot-fluid passage 81; and means such as a flap valve element 82, (which may be remotely manipulable either manually, through means symbolized by a handle 83, connected therewith through a rod 84, or by automatic means such as a thermostatic device connected therewith by an additional rod 85 both of said rods being shown as pivoted to short arms 86, 87 assumed to be rigidly connected with the valve element 82 through a pivot shaft 88) may be employed to control the flow of the hot and cold temperature regulating fluids into the jacket 77; and means such as a spring 89 interposed in the rod 85 may be employed to permit dominance by the manual adjustment, regardless of the position of any thermostatically movable part 90 with which the rod 85 may be connected. For the sake of diagrammatic completeness a high-coefficient rod 90 is shown as disposed centrally within the filtering unit. The upper or inner end of said rod may be integral with or threaded in the bolt 47. Slidable through a gland 92, shown as carried by the nut 43, the thermostatic rod 90 is shown as pivoted at 93 to the rod 85,—the spring 89 in the lateral rod being sufficiently stiff normally to transmit motion to the valve 82 or its equivalent. For the purposes of the present invention, the sources of the respective heating and cooling fluids admitted through the respective passages 80 and 81, as proposed in Fig. 3, may be regarded as immaterial,—attention being merely called to the facts that hot water is commonly circulated to a radiator (not shown) relatively cool water being returned therefrom, and that hot air may be obtained from the exterior and interior of a crank case and relatively cool air from a suitably positioned funnel or the like.

As suggested in Fig. 1, the interior of the oil pan 18 or its equivalent may, if desired, be provided with transverse troughs 94, adapted to receive drainage from the respective cranks 13 and/or overflow delivered through valved or other outlet 70, 73 and/or 75; and it will be obvious that during an initial warming-up period, even though the entire body of oil be relatively cold and stiff, adequate lubrication of interior parts may be obtained through the splash effect graphically suggested in Figure 1. During this interval, both the friction of moving parts and the exposure of splashed oil droplets to interior engine temperatures, and also the operation of the pump 20, preferably immersed in said oil, are favorable to a rapid "thinning" or diminution in the viscosity of the oil,—thereby adapting the same to be circulated in the general manner referred to; and the building up of a desired pressure within the separatory receptacle 30, upon a lowering of the oil level within the pan 18 and a consequent admission of aeriform bodies to the pump 20, is intended to be substantially concurrent with the automatic discontinuance of splash lubrication as a result of emptying of the troughs 94 and/or the pan 18.

Normal running may be established, as suggested in Figure 4, within a period of about twenty seconds; and thereafter, as suggested by the horizontal portion of the line 95, a predetermined pressure of (say) thirty pounds (this pressure being naturally always greater than that in the crank case) may be continuously maintained within the pressure conduits 22, 23, or the like,—as compared with the initially high pressure and subsequent low pressure involved in the operation of a heretofore conventional system as represented by the line 96. It will be obvious that the valved outlet 73, when employed, is intended to open at a less pressure than the valved by-pass 71, and the latter is intended to open at a less pressure than the relief valve 70; and that, in view of the relatively higher pressure and lower temperature normally maintained in reservoir 30, or its equivalent, withdrawal of light vapors from the crank case 17 and spaces communicating therewith is not a matter of distillation but rather a matter of entrainment in air admitted through any appropriate openings.

Obviously, the pressure applied to the oil in reservoir 30 is effective to maintain an advance thereof for a considerable period after the engine is stopped, thereby providing for a film of lubricant upon all bearings, in preparation for its next start.

In the practice of this invention, it should be understood that different sets of bearings may be automatically fed under different pressures,— as by the provision of additional reducing valves disposed somewhat as suggested at 97, Fig. 1, these being equally or variously adjusted to a less pressure or pressures than valve 73. The valve 97 is shown as interposed in a conduit 98,— which may be assumed to lead to rocker arm bearings, or the like, not shown, from conduits 99, 99', or the like.

The indicated position of the thermal control unit comprising jacket 77 and/or parts therein is not only economical of space and of machine parts but also favorable to a desired flow of heat,—facilitating filtration and/or delivery of oil at a desired temperature; the mentioned gauge 45 and additional gauge 45' may be connected as by passages 46, 46', with exit passage 44 and passage 35 from a normalizing assembly including any or all of the described units; a cushioning gasket, or the like, may well be interposed, as at 98', between a "flat" on the crank case and a corresponding face of the casting 25, or its equivalent,—this precaution being especially desirable in case one or both of the receptacular elements 30, 36 are formed of glass, to facilitate inspection; as suggested in Fig. 2, the crank case 17' may be of conventional form, the casting 25' being shaped in adaptation thereto and suitable apertures being provided to facilitate inspection; and some easily accessible passage (as, the passage 46, 46' and/or the passage 44) may, if desired, receive, in cold climates or during cold weather, a self-limiting or other resistance heating unit 99,—shown as included in a circuit 100 and as positioned favorably to an immediate warming of an early-delivered charge of oil. This circuit may be self-opened before or when a starter is energized; and/or the said heating element may be permitted to "cut in" whenever the temperature of the delivered oil falls below a predetermined range.

As there is obviously no actual necessity for ever using such a total quantity of oil as to cause that overflow from receptacle 30 or its equivalent for which the pipe 74 (or 74') provides, this pipe and valve 76 may ordinarily be dispensed with; and it will be understood that the normal-running advance of bubbles 101 along with the oil pumped during dry-sump operation is favorable not only to crank case ventilation, for the removal of undesired vapors at or below atmospheric pressure, and to the described method of predetermining a pressure range within a separatory receptacle 36, but to the prompt and economical establishment of a thermal balance,—said bubbles tending both to throw films of oil into contact with the heated or cooled walls of the coil 31 and to transmit heat by interior paths; and the vapor take-off pipe 52 may be utilized, if desired, to deliver, under atmospheric or other low pressure, any entrained and diluted light oil to additional bearings, as at 102.

The pumps or pumps 20 must obviously be of a type adapting it to pump aeriform bodies with an oil or a mixture of oils and it may be of such a size or oversize as to pump considerable volumes of air during normal running; the quantity of oil in the system may be such that, allowing for some entrapping of oil in the filter unit 34, or in any equivalent composition-control unit, and/or in the coil or conduit 31 of any thermal-control unit, and/or even in a separatory pressure-control unit comprising a reservoir 30 (especially if the latter unit delivers, as shown, through one of the other units mentioned) the introduced and/or returned oil may "initially" fill any splash troughs 94 and/or stand in pan 18, or its equivalent, at such a level as that indicated by dotted line 103, Fig. 1.

As indicated, upon restarting, air and/or other aeriform bodies undergoing increasing compression in the reservoir 30 as the oil falls to and below the line 103' in the pan 18 and rises to a desired level in said reservoir (somewhat as suggested by a dotted line 104 therein) may bring the pressure within the conduit 22, 23 etc. promptly up to a limit predetermined by the setting of valve 54 and/or by the level of a float 105 connected with valve 76,—a desired and economical rate of withdrawing vapors and reconditioning oil and a desired pressure balance and a desired thermal balance being then definitely maintained during continued upward feed of a stream of oil entraining bubbles 101, the separated oil being constantly delivered under pressure from reservoir 30, and these cycles being indefinitely repeated.

To obtain different pressure effects in response to throttle adjustment or to variations in speed, the rod or link 66 may be variously connected with apertured arms of a member such as the mentioned lever 64,—automatically varying in either direction desired, and either proportionately or disproportionately, the pressure of oil delivery with speed during running; but this extended mention of optional features must not obscure the facts that the present invention economicaly provides for all necessary reconditioning of oil,—delivering the same uniformly and economically at a constant or an automatically varied pressure during that normal running which follows a self-limited period of splash lubrication, and returning to splash lubrication in case of obstructed passages; and that it assures a prolongation of the period of splash lubrication in case the starting of the engine occurs after oil, having slowly descended through bearings and/or troughs, has become undesirably "stiff" therein. Although the foregoing description has included complete details of but one illustrative embodiment of the present invention, various alternative and optional features being incidentally referred to, it will be understood not only that numerous additional modifications might easily be devised, in view thereof, but also that various features of the present invention may be independently employed,—all without the slightest departure from the spirit and scope of this invention.

I claim:

1. An internal combustion engine comprising: a crankcase; means therebelow for an initial retention of oil at a level favorable to splash lubrication; a pressure receptacle; means for advancing oil thereto; parts to be lubricated; and means effecting delivery of oil from said receptacle to different parts under different predetermined pressures.

2. An internal combustion engine comprising: a crankcase; means therebelow for an initial retention of oil at a level favorable to splash lubrication; a pressure receptacle; means for advancing oil thereto; parts to be lubricated; and means for effecting delivery of oil from said receptacle to some of said parts,—said receptacle being provided with means for automatically varying the pressure upon the oil therein.

3. An internal combustion engine comprising: a crankcase; means therebelow for an initial retention of oil at a level favorable to splash lubrication; a pressure receptacle; means for advancing oil thereto; parts to be lubricated; and means for effecting delivery of oil from said receptacle to some of said parts,—said receptacle being provided with means for automatically varying the pressure upon the oil therein in accordance with variations in speed of said parts.

4. An internal combustion engine comprising: a crankcase; means therebelow for an initial retention of oil at a level favorable to splash lubrication; a pressure receptacle; means for advancing oil thereto; parts to be lubricated; and means for effecting delivery of oil from said receptacle to some of said parts,—said receptacle being provided with means for automatically varying the pressure upon the oil therein to apply a drooping characteristic thereto, in response to variations in speed.

5. In a lubricating system, a conditioning unit which includes a supporting element, an element for separating gas from the lubricant mounted on the supporting element, an element for separating solids from the lubricant mounted on the supporting element and a passage in the supporting element to conduct partly purified lubricant from one of the separating elements to the other.

6. In a lubricating system, a conditioning unit which includes a supporting element, an element for separating gas from the lubricant mounted on the supporting element, an element for separating solids from the lubricant mounted on the supporting element, an element for thermally conditioning lubricant mounted on the supporting element and passages in the supporting element for conducting partly conditioned lubricant from one conditioning element to another and thence to the third.

7. In an internal combustion engine, means for advancing lubricant to bearings under pressure, and mechanism in addition to the mentioned means for varying the pressure of the lubricant with variations in speed of the engine.

8. In an internal combustion engine, which includes lubricant passages communicating with a lubricant conditioning element and a bearing, a relief valve on the intake side of the conditioning element, and a relief valve on the intake side of the bearing and on the discharge side of the conditioning element which is adapted to open at a lower pressure than the first mentioned relief valve.

9. The invention claimed in claim 5 plus a passage in the supporting element for conducting lubricant from the conditioning unit, and a passage in the supporting element through which lubricant may enter the last mentioned passage without passing through the element for separating solids from the lubricant.

10. The invention claimed in claim 6 plus a passage in the supporting element for conducting lubricant from the conditioning unit, and a passage in the supporting element through which lubricant may enter the last mentioned passage without passing through the element for separating solids from the lubricant.

11. In a lubricating system, a conditioning unit which includes a supporting element, an element for separating solids from the lubricant mounted on the supporting element, an element for thermally conditioning lubricant mounted on the supporting element, a passage in the supporting element adapted to conduct partly conditioned lubricant from one of the conditioning elements to the other, a passage in the supporting element for conducting lubricant from the conditioning unit and a passage in the supporting element through which lubricant may enter the last mentioned passage without passing through the element for separating solids from the lubricant.

12. The invention claimed in claim 6 in which the element for thermally conditioning lubricant includes a temperature regulating fluid passage in heat exchanging relation with the element for separating solids from the lubricant.

13. In a lubricating system, a conditioning unit which includes a supporting element, an element for separating solids from the lubricant mounted on the supporting element, an element for thermally conditioning lubricant which includes a temperature regulating fluid passage in heat exchanging relation with the element for separating solids from the lubricant mounted on the supporting element, and passages in the supporting element for conducting partly conditioned lubricant from one of the conditioning elements to the other.

14. In an internal combustion engine, a reservoir in which lubricant is adapted to accumulate while the engine is not operating, parts which move during normal operation of the engine and are adapted initially to agitate the lubricant in the reservoir and supply lubricant to the parts to be lubricated by splash, a pump for delivering lubricant from the reservoir to parts to be lubricated and means whereby the pump may return lubricant to the reservoir instead of delivering it to the parts to be lubricated.

JAMES B. WATSON.